(12) United States Patent
Beard

(10) Patent No.: X7698
(45) Date of Patent: Aug. 5, 1833

(54) GARMENTS, MARKING OUT & CUTTING

(76) Inventor: George Jr. Beard

George Beard Junr. of West Whiteland township, county of Chester & State of Pennsylvania -

Letters Patent.

The schedule referred to in these Letters Patent, & making part of the same, containing a description in the words of the said George Beard Junr. himself, of his improvement in the plan for marking off & cutting out garments, called "Beard's graduated Pattern rule.

To all to whom these Presents shall come

Be it known, that I George Beard Junr of West Whiteland township in the county of Chester and state of Pennsylvania, have invented a new and useful rule or plan for marking off & cutting out, coats, vests, pantaloons, & all other garments or parts of clothing called Beard's graduated pattern rule. & that the following is an exact description of the construction & operation of said rule as invented by me -

A small sized garment is marked off complete on paper near the centre, a large size is also marked off near the extremity and all the intervening sizes graduated, numbered & marked on the space between - The sizes are marked at every point and curve over the pattern with numerical figures each size being marked with its corresponding number - At each numeral mark an orifice or incisure is perforated thro' the pattern so that it can be laid on a piece of cloth or other stuff & a garment of any size marked off complete by marking thro' the incisures - The component parts of a garment may be put separately on separate pieces of paper, when more convenient -

A scale of variations for the different sizes is also marked on the pattern, accompanied with written directions for applying them when the garment is intended to fit a person who is misshapen -

The plan of graduating sizes on a pattern, as well as the adaptation of such patterns, to marking off & cutting out coats, vests, pantaloons and all other garments or parts of clothing I hereby Assign Transfer and set over unto John Gleam of the township of West
Whiteland his Heirs Executors and Administrators for the consideration of one dollar to me
in hand paid all my right Title and interest of the within Letters Patent as well as
all and singular the profits and emoluments arising therefrom To have and to hold
to the same John Gleam his Heirs Executors Administrators and Assigns for and
during the unexpired time thereof and untill the full expiration of said Letters
patent witness my hand and seal this twentieth day of September in the year of
our Lord one thousand eight hundred & thirty [illegible]

George Beard[illegible] (Seal)

Sealed and delivered in
the presence of us
John Watkins
Geo. Boyer

Chester County ss

Be it remembered that on the 20th
day of September in the year of our Lord one thousand eight hundred & thirty
[illegible] Before me the subscriber one of the Justices of the peace in and for the County
of Chester personally appeared the said George Beard[illegible] and acknowledged the
above Assignment of the within Letters Patent to be his act and deed in due
form of law to the intent the same may be recorded as such in testimony
whereof I have hereunto set my hand and seal the date aforesaid.

George Boyer (Seal)

Exd.
[illegible]

[illegible]

United States Patent

Patent No.: X7698 is claimed in this invention

Witnesses

William Guthrie

Alex.r Marshall.

George Beard Junr.

Exd

Tyl

T396 1.21